Feb. 10, 1970  E. M. GREER  3,494,378
PRESSURE VESSELS
Filed Nov. 17, 1966  2 Sheets-Sheet 1
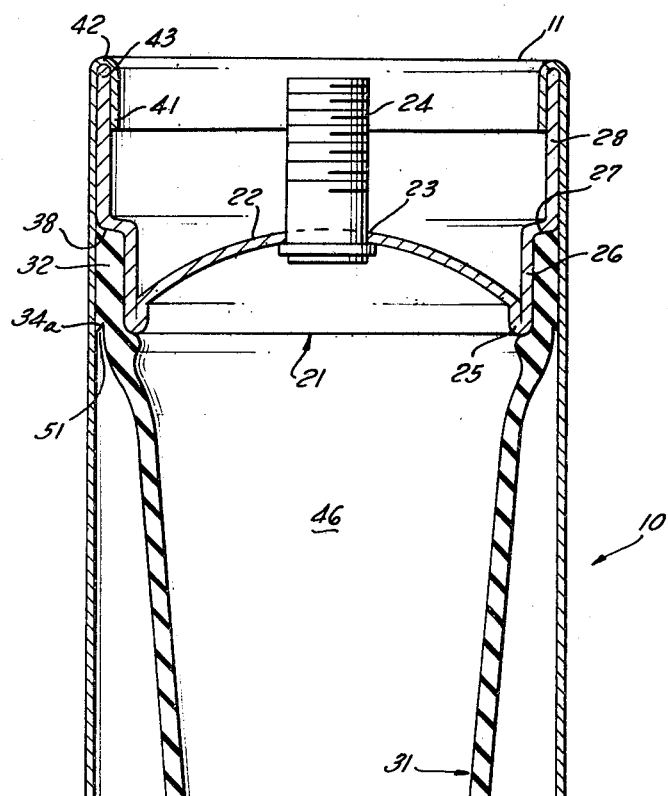
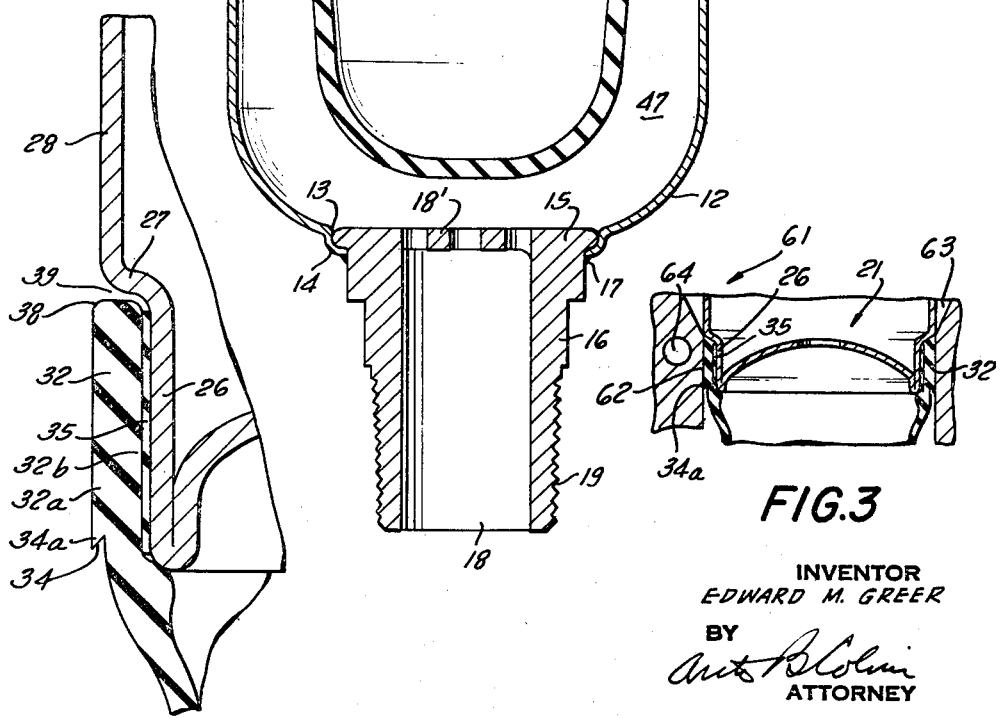
INVENTOR
EDWARD M. GREER
BY
ATTORNEY

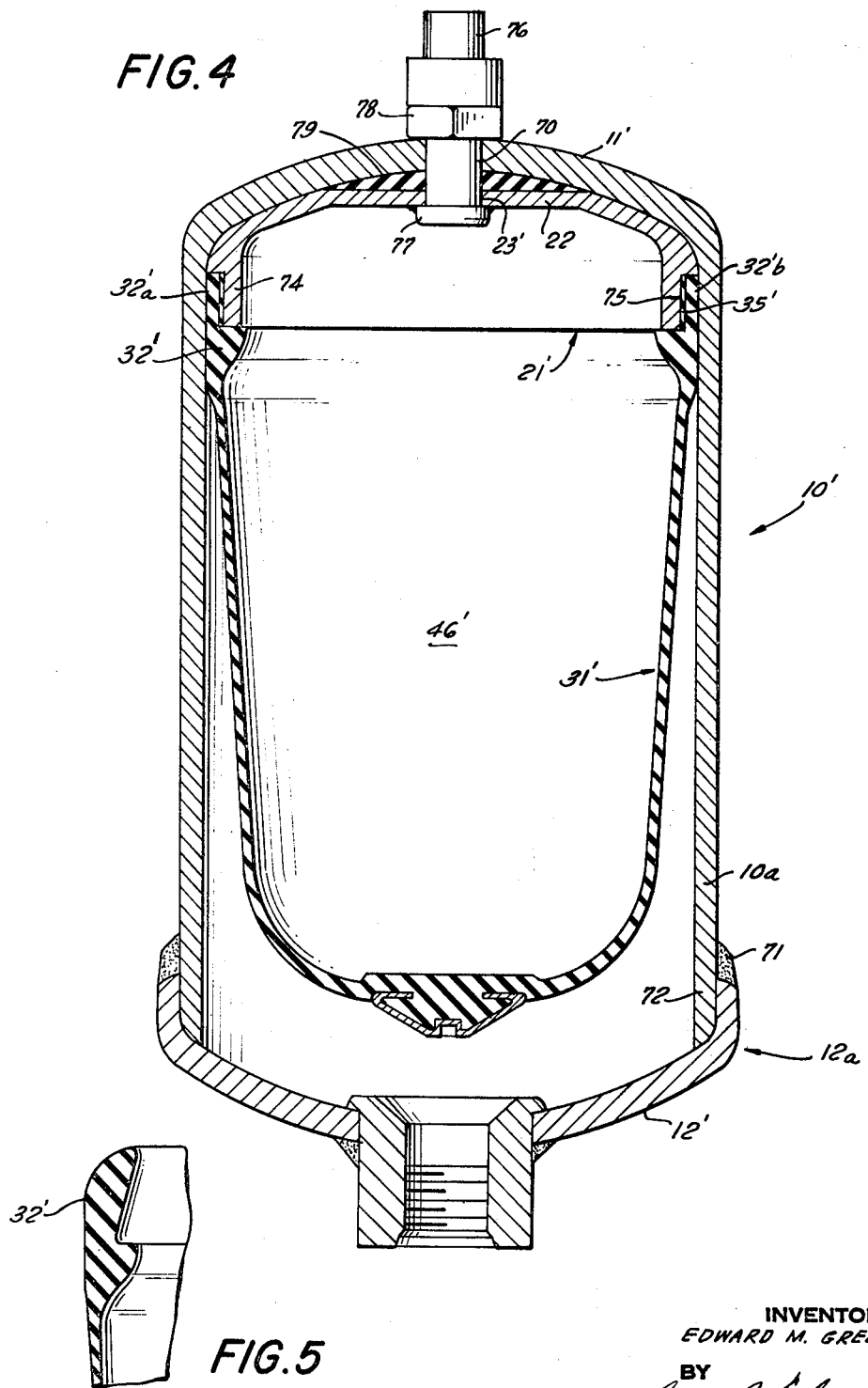

United States Patent Office 3,494,378
Patented Feb. 10, 1970

3,494,378
PRESSURE VESSELS
Edward M. Greer, Beverly Hills, Calif., assignor to Greer Hydraulics, Inc., Los Angeles, Calif., a corporation of New York
Filed Nov. 17, 1966, Ser. No. 595,164
Int. Cl. F16l 55/04, 55/02
U.S. Cl. 138—30      7 Claims

ABSTRACT OF THE DISCLOSURE

This invention relates to the art of pressure vessels, more particularly of the type using a deformable bladder having a cylindrical mouth of relatively large diameter compared to the diameter of the bladder and which snugly encompasses an annular metal retaining member, being secured thereto by curing a layer of rubber interposed between said annular retaining member and the adjacent portion of said bladder mouth.

---

As conducive to an understanding of the invention, it is noted that where a pressure vessel of the above type has a rigid cylindrical shell or container in which a metal retaining member is positioned, that is secured in fixed position adjacent one end of the container, and a deformable partition such as a bladder of resilient stretchable material, illustratively of synthetic rubber, is positioned in said container with the periphery or mouth of the bladder secured to the retaining member, unless a dependable seal is formed between the periphery or mouth of the bladder and the retaining member and the periphery or mouth of the bladder and the container, leakage will occur with resultant failure of the unit.

Where the periphery or mouth of the bladder is mechanically clamped between the retaining member and the container, if there should be any irregularities or lack of concentricity in the retaining member, slight openings or passageways will occur with resultant gas leakage.

Where the bladder which has already been cured is cemented to the metal retaining member, an unreliable bond will occur which under the constant stress resulting from the pressure in the unit and the constant stretch and relief from stretch during use of the unit, may break the cemented bond with resultant leakage.

Furthermore since the bladder stretches considerably in use and its overall stretch may be as high as 40 percent, which reacts against the portion of the bladder secured to the retaining member, unless a dependable bond is effected the bladder may pull away from the retaining member with resultant failure of the unit.

It is accordingly among the objects of the invention to provide a pressure vessel of the above type, and method for forming the same, which may readily be fabricated at relatively low cost from relatively inexpensive parts in a relatively simple manner, without need for holding close tolerances, with assurance that the periphery or mouth of the preformed bladder will remain securely and permanently bonded to the metal retaining member positioned in the container.

According to the invention these objects are accomplished by the arrangement and combination of elements hereinafter described and more particularly recited in the claims.

In the accompanying drawings in which are shown various possible embodiments of the several features of the invention, FIG. 1 is a longitudinal sectional view of a pressure vessel according to one embodiment of the invention, FIG. 2 is a detail sectional view on an enlarged scale showing the mouth of the bladder bonded to the retaining member.

FIG. 3 is a detail sectional view of a jig for holding the retaining member when the bladder is being bonded thereto, FIG. 4 is a view similar to FIG. 1 of another embodiment of the invention, and FIG. 5 is a fragmentary sectional view of the bladder of FIG. 4.

Referring now to the drawings, as shown in FIG. 1, the pressure vessel, which in the illustrative embodiment is a pressure accumulator, comprises a shell or container 10 of rigid material such as aluminum, steel, brass or the like, capable of withstanding the pressures to which the unit will be subjected in use.

The container 10 is substantially cylindrical as shown, having a mouth 11 and a rounded lower end 12 having an axial opening 13 therein which is conformed to define an inwardly extending annular flange 14 on which is seated the flage 15 of a sleeve or fitting 16 which is secured in place as by welding at 17 and defines the liquid port 18 of the pressure vessel.

As is clearly shown in FIG. 1, the inner end of the sleeve 16 has a perforated plate 18' extending transversely thereacross and the sleeve is desirably externally threaded as at 19 to permit connection thereto of a correspondingly threaded fitting (not shown).

Positioned in the mouth of the container 10 is metal retaining member 21 which also forms the cover for the mouth of the container. The member 21 illustratively has a curved central portion 22 with an axial opening 23 in which a fitting 24 is secured to retain an air valve, for example, (not shown). The periphery 25 of the central portion 22 is reversely bent to define a mounting sleeve 26, the outer edge of which is outwardly bent to define an annular shoulder 27. Rising from the periphery of shoulder 27 is a retaining sleeve 28 of outer diameter substantially equal to the inner diameter of the container 10.

Secured to the outer surface of mounting sleeve 26 is a deformable partition 31 illustratively a bladder of synthetic rubber such as Buna, Butyl, Neoprene or similar material having like characteristics.

As is clearly shown in FIG. 2, the mouth of the bladder 31 has an elongated thickened rim 32 which is of length substantially equal to that of the mounting sleeve and the lower edge of the outer portion 32a of rim 32 is beveled as at 34 to form a sealing lip or chevron seal 34a.

To assemble the pressure vessel, a layer 35 of uncured rubber, preferably but not necessarily of the same type as that from which the bladder 31 is formed, is positioned around the mounting sleeve 26 which previously has been cleaned and roughened as by a wire brush, for example. The layer 35 may be sprayed or painted on, or a strip of suitable material may be provided and in the illustrative embodiment shown, such a strip is povided. Thereupon, the mouth of the bladder which normally is approximately of diameter five (5%) percent less than the outer diameter of sleeve 26 is stretched so that it will be positioned tightly around the sleeve 26 and the uncured strip 35 of rubber, the inner surface 32b of rim 32 of the bladder 31 also having been cleaned and roughened prior to mounting.

Thereupon, the cover member 21 with the bladder mounted thereon as above described is subjected to heat to cure the strip 35. To this end the assembly preferably is positioned in a jig 61 which has a cylindrical opening 62 with a beveled mouth 63. When the cover member is forced into opening 63, the rim 32 will be compressed as shown, between the cylindrical open 62 and the sleeve 26.

With the cover member 21 thus positioned in jig 61, the heating elements 64 in the jig 61 are energized so that the strip 35 will be cured to bond the rim 32 of the bladder 31 to the sleeve 26. Different materials require different temperatures and time cycles. However, using Buna N, for example, as the composition from which the bladder is formed, with the strip 35 also of Buna N, a temperature of from approximately 250° to 350° F. for approximately 10 to 40 minutes is sufficient to completely cure the strip 35 and effect a permanent bond between rim 32 and sleeve 26, the strip 35 becoming an integral part of rim 32.

By reason of the use of the uncured layer of rubber 35, a highly effective bond will be effected to the metal sleeve 26 which could not be made if the cured rubber bladder was cemented or otherwise adhesively secured to the metal sleeve 25. Furthermore, by reason of the "choking" effect produced by the stretched rim of the bladder, the uncured rubber strip 35 will be forced into intimate engagement with both the inner portion 32b of the rim 32 of the bladder 31 and the outer surface of sleeve 26 so that no air holes or passageways will be present between the rim 32 and sleeve 26 even if there are slight irregularities in the metal sleeve 26.

After the rim 32 of the bladder 31 has been bonded to the sleeve 26, as above described, the cover member 21 with the bladder bonded thereto, is then forced into the open mouth of the container 10. As shown in FIG. 2, in its bonded condition, the outer portion 32a of rim 32 extends slightly beyond the plane of the outer surface of retaining sleeve 28 and the upper edge 38 of the rim 32 is slightly spaced from annular shoulder 27 as at 39.

Thus, when the assembled cover member 21 is forced into the mouth of the container, the rim 32 will be compressed between the wall of the container and the sleeve 26 as shown in FIG. 1. As a result of the space 39, the upper edge 38 of rim 32 will be free to move upwardly until it abuts against shoulder 27 and the lower edge of rim 32 will move downwardly and the cheveron lip or seal will be compressed between the wall of the container and the lower edge 25 of sleeve 26 to define an effective seal.

Thereupon, the free edge 41 of the container is reversely bent as at 42 over the upper edge 43 of sleeve 28 securely to retain the cover member 21 in fixed position.

In use of the pressure vessel, the chamber 46 defined by the bladder is charged with gas under pressure through fitting 24 which is then closed. Thereupon, fluid such as hydraulic liquid under pressure is forced through port 18 to charge the chamber 47 on the other side of the bladder and compress the gas in the latter.

Since the inner portion 32b of the rim 32 is dependably bonded to sleeve 26, there will be no possibility of gas under pressure leaking from chamber 46. As the outer portion 32a of rim 32 is pressed tightly against the wall of the container an effective seal is provided which is enhanced by the chevron lip seal 34a at the lower edge of rim 32. Thus, as the hydraulic liquid under pressure in chamber 47 reacts against the chevron lip 34a, as at 51, it will force the lip outwardly against the wall of the container for effective sealing action.

In the embodiment shown in FIGS. 4 and 5, parts corresponding to those in FIGS. 1 to 3 have the same reference numerals primed.

In this embodiment, as shown in FIG. 4, the shell or container 10' has the end 11' thereof remote from the rounded lower end 12', substantially closed, being provided with a relatively small port 70.

More particularly the end 12' is defined by a cap 12a which is secured as by welding at 71 to the open end 72 of the cylindrical portion 10a of the container 10'.

The retaining member 21' of FIG. 4 illustratively is substantially cup-shaped having a floor 22' with an axial opening 23' and a depending annular wall 74 with an external annular recess 75.

A gas fitting 76 having an annular flange 77 at its inner end, extends through opening 23' in the floor 22' and is secured thereto as by welding. The stem of fitting 76 extends through the opening 70 in the end of container 10' and by means of a nut 78 screwed on the threaded end of the stem 76, the floor 22' of retaining member 21' is moved against the undersurface of end 11' of the container. Desirably, a sealing washer 79 encompasses the stem 76 between the floor 22' and the end 11' of the container.

The rim 32' of the bladder 31' is bonded to the annular wall of recess 75 in the same manner as described with respect to the embodiment of FIG. 1. Thus, the rim 32' of bladder 31' is stretched to encompass the annular wall 74 which previously has been provided with a layer 35' of uncured rubber as illustratively shown in FIG. 4, which is then heated to effect curing thereof for effective bonding action. It is understood that after curing, the layer 35' will become an integral part of rim 32'.

The pressure vessel shown in FIG. 4 is assembled by inserting the assembly comprising the retaining member with the bladder bonded thereto through the open end 72 of container 10', so that the stem 76 protrudes through port 70. Thereupon, the nut 78 is tightened, drawing the flange of the retaining member 21' against the end 11' of the shell thereby compressing the gasket 79.

The cap 12a is positioned over the end 72 of the shell and welded in position.

In the embodiment shown in FIGS. 4 and 5, since the inner portion of rim 32' is also dependably bonded to the annular wall 74, there will be no possibility of gas under pressure leaking from chamber 46'. As the outer portion 32a' of rim 32' is pressed against the wall of the container, an effective seal will be provided between the container wall and the retaining member 21' to prevent leakage of oil.

As many changes could be made in the above method and article it is intended that all matter contained in the above description or shown in the accompanying drawings shall be interpreted as illustrative and not in a limiting sense.

Having thus described my invention, what I claim as new and desire to secure by Letters Patent of the United States is:

1. As an article of manufacture a bladder assembly comprising a metal retaining member having a peripheral annular portion, an outwardly extending annular flange at the upper end of said annular portion defining a shoulder, a retaining sleeve rising from the outer edge of said flange, a bladder of cured rubber having a peripheral rim snugly encompassing the annular portion, said bladder rim extending from substantially the lower edge of said annular portion to a point slightly spaced from said flange and a layer of rubber interposed between the rim of the bladder and said annular portion and cured to bond said rim to said annular portion.

2. The combination set forth in claim 1 in which said bladder rim has an outwardly extending lip at its lower edge on its outer periphery defining a chevron seal, the lower edge of said lip lying in a plane above the lower edge of said annular portion.

3. The combination set forth in claim 1 in which the outer diameter of said rim is slightly greater than the outer diameter of said annular portion.

4. A pressure vessel comprising a cylindrical container having an axial port at one end and an opening at the other end, a retaining member positioned in said container adjacent said opening, said retaining member having a depending mounting portion, means to secure said retaining member in said container, a bladder positioned in said container and intervening between said port and said opening, said bladder having a thickened rim of length substantially equal to that of said mounting portion and snugly encompassing the latter, a layer of rubber interposed between said rim and the mounting portion and cured to bond said rim to said mounting portion, said rim being compressed between said mounting portion and the wall of said container.

5. A pressure vessel comprising a cylindrical container having an axial port at one end and a mouth at the other, a cover member positioned in said mouth, said cover member comprising a top wall having an axial opening defining a port and a reversely bent periphery defining a mounting sleeve of outer diameter less than the inner diameter of said container, said sleeve having an outwardly extending flange at its upper edge defining a shoulder, a support sleeve rising from the outer periphery of said flange and of outer diameter substantially the same as the inner diameter of said container, the free edge of said container at its mouth being reversely bent over the upper edge of said mounting sleeve, a bladder positioned in said container and intervening between said ports, said bladder having a thickened rim of length substantially equal to that of said mounting sleeve and snugly encompassing the latter, a layer of rubber interposed between said rim and the mounting sleeve and cured to bond said rim to said sleeve, said rim being compressed between said mounting sleeve and the wall of said container.

6. The combination set forth in claim 5 in which the rim of said bladder has an outstanding annular lip at its lower edge on its outer periphery defining a chevron seal, the lower edge of said lip lying in a plane above the lower edge of said mounting sleeve and engaging the wall of said container.

7. The combination set forth in claim 5 in which the upper edge of said rim engages said annular shoulder.

References Cited

UNITED STATES PATENTS

| | | | |
|---|---|---|---|
| 3,138,176 | 6/1964 | Mercier | 138—30 |
| 3,288,168 | 11/1966 | Mercier et al. | 138—30 |
| 3,368,586 | 2/1968 | French et al. | 138—30 |
| 3,251,380 | 5/1966 | Mercier | 138—30 |
| 3,376,625 | 4/1968 | McCulloch | 138—30 X |
| 3,379,216 | 4/1968 | Mercier | 138—30 |

PATRICK D. LAWSON, Primary Examiner